United States Patent
Lim et al.

(10) Patent No.: US 6,912,184 B2
(45) Date of Patent: Jun. 28, 2005

(54) METHOD AND APPARATUS OF MEASURING AXIAL VIBRATION OF A DISK RECORDING MEDIUM

(75) Inventors: Jae Cheol Lim, Suwon-si (KR); Hong Jo Jeong, Pyungtak-si (KR)

(73) Assignee: Hitachi-LG Data Storage Korea, Inc., Seoul (KR)

( * ) Notice: Subject to any disclaimer, the term of this patent is extended or adjusted under 35 U.S.C. 154(b) by 501 days.

(21) Appl. No.: 10/216,226

(22) Filed: Aug. 12, 2002

(65) Prior Publication Data

US 2003/0063531 A1 Apr. 3, 2003

(30) Foreign Application Priority Data

Sep. 20, 2001 (KR) ........................................ 2001-58369
Jul. 5, 2002 (KR) ........................................ 2002-39056

(51) Int. Cl.$^7$ ............................................. G11B 7/00
(52) U.S. Cl. ................................ 369/44.32; 369/44.25; 369/53.18
(58) Field of Search ...................... 369/44.11, 44.23, 369/44.25, 44.27, 44.32, 44.34, 53.1, 53.12, 53.18, 124.15, 124.01

(56) References Cited

U.S. PATENT DOCUMENTS

| 5,936,934 A | * | 8/1999 | Kuribayashi et al. | ....... 369/286 |
| 6,310,852 B1 | * | 10/2001 | Tomita et al. | ......... 369/112.24 |
| 6,414,921 B1 | * | 7/2002 | Kim | ........................ 369/47.44 |

* cited by examiner

Primary Examiner—Muhammad Edun
(74) Attorney, Agent, or Firm—Birch, Stewart, Kolasch & Birch, LLP

(57) ABSTRACT

The present invention relates to method and apparatus of measuring axial vibration of a rotating disk. The present axial vibration measuring method selects a plurality of equally-spaced (45°~120°-spaced) angular positions of a disk recording medium to conduct focusing operation at, conducts focusing operation at each selected position, measures focusing time from each start of the focusing operation to exactness in focus, and calculates axial vibration of the disk recording medium based on a deviation of the measured focusing times. The present method can measure exactly how much a rotating disk vibrates axially.

20 Claims, 6 Drawing Sheets

| Phase (k) | Focusing Time | Time Difference |
|---|---|---|
| 0 | T0 | DT0 |
| 1 | T1 | DT1 |
| 2 | T2 | DT2 |
| ⋮ | ⋮ | ⋮ |
| M | T$_M$ | DT$_M$ |
| ⋮ | ⋮ | ⋮ |
| N | T$_N$ | DT$_N$ |
| Average of Focusing Times : Tavg | | |

602 (Time Difference column)
601 (Average of Focusing Times)

*Phase = 360\*k/(N+1)*
*where N+1 is 6 or 8*

METHOD AND APPARATUS OF MEASURING AXIAL VIBRATION OF A DISK RECORDING MEDIUM

BACKGROUND OF THE INVENTION

1. Field of the Invention

The present invention relates to method and apparatus of measuring axial vibration of a rotating disk.

2. Description of the Related Art

A disk device such as a disk drive installed in a PC rotates an optical disk e.g., a compact disk or a digital versatile disk placed on a turntable at high speed with a spindle motor. While rotating the disk, the disk device conducts tracking and focusing operation of an objective lens of an optical pickup to detect signals written on a recording layer of the rotating disk without errors.

The tracking and the focusing operation are adjusted based on tracking and focusing error signal, respectively, that are produced out of beams reflected from a recording layer. Such tracking and focusing operation ensure an optimal signal reading condition.

However, if a rotating disk at high speed by a spindle motor vibrates axially, it is difficult for a focusing servo mechanism to maintain an exact focus on a recording layer. Thus, in this situation, a focusing servo gain need to be adjusted to increase sensitivity of a focusing servo.

In the event that axial vibration of a disk is too severe to compensate through gain adjustment of a focusing servo, it may be impossible to reproduce the disk rotating at high speed. If determined to impossible, the disk rotation speed must be reduced or the disk must be ejected without unnecessary reproduction attempts.

For such a reason, it is needed to measure accurately how much a disk vibrates axially.

SUMMARY OF THE INVENTION

It is an object of the present invention to provide a method of accurately measuring axial vibration of a disk to be reproduced.

It is another object of the present invention to provide a method of controlling a focusing servo to compensate axial vibration of a rotating disk.

It is another object of the present invention to provide a method of detecting amplitude of axial vibration for each phase of a disk and conducting a minute adjustment of focusing servo control against axial vibration on each phase.

A method of measuring axial vibration of a rotating disk recording medium is characterized in that it includes the steps of: selecting a plurality of equally-spaced angular positions of a disk recording medium to conduct focusing operation at; conducting focusing operation at each selected position; measuring focusing time from each start of the focusing operation to exactness in focus; and calculating axial vibration of the disk recording medium based on the measured focusing times.

Another method of measuring axial vibration of a rotating disk recording medium is characterized in that it includes the steps of: detecting a current angular position on a rotating disk recording medium, measuring amplitude of axial vibration at the detected position whenever the position is one of predetermined equally-spaced angular positions; and adjusting a characteristic of a focusing servo mechanism to be suitable to a coming reproduction area next to a current area based on all the measured amplitudes at the predetermined equally-spaced positions, while the disk recording medium is reproduced.

BRIEF DESCRIPTION OF THE DRAWINGS

The accompanying drawings, which are included to provide a further understanding of the present invention, illustrate the preferred embodiments of the invention, and together with the description, serve to explain the principles of the present invention, and wherein.

DETAILED DESCRIPTION OF THE PREFFERRED EMBODIMENT

In order that the invention may be fully understood, a preferred embodiment thereof will now be described with reference to the accompanying drawings.

Figure 1:
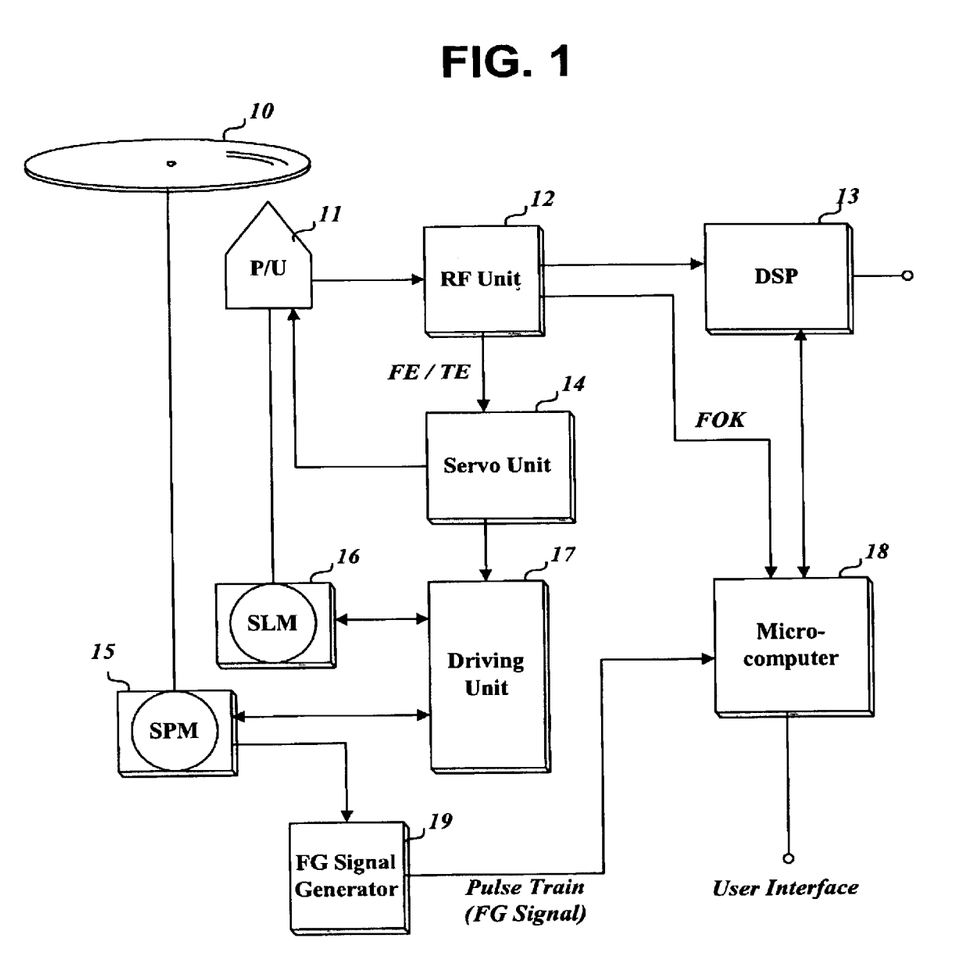
FIG. 1 is a block diagram of a disk device in which a method measuring axial vibration of a disk in accordance with the present invention is embedded.

FIG. 1 is a block diagram of a disk device in which a method measuring axial vibration of a disk in accordance with the present invention is embedded.

The disk device of FIG. 1 includes an optical pickup 11 reading recorded signals on a disk 10 such as a compact disk (CD) or a digital versatile disk (DVD); an RF unit 12 converting the read signals by the pickup 11 to binary signals, producing an FE (Focusing Error) and a TE (Tracking Error) signal through combining the read signals, and outputting an FOK (Focusing OK) signal the moment exact focusing is made; a DSP (Digital Signal Processor) 13 processing the binary signals to restore them to original data; a servo unit 14 conducting focusing and tracking operation of an objective lens of the pickup 11 based on the TE and the FE signal from the RF unit 12; a spindle motor 15 rotating the disk 10 under control of the servo unit 14; a sled motor 16 moving the pickup 11 radially over the disk 10; a driving unit 17 driving the spindle motor 15 and the sled motor 16; an FG signal generator 19 producing pulse train (also called 'FG signal') while the spindle motor 15 rotates the disk 10; and a microcomputer 18 measuring amplitude of axial vibration on every phase of the disk 10 based on focusing time difference on the phase, and controlling a focusing servo based on the measured axial vibration.

Figure 2:
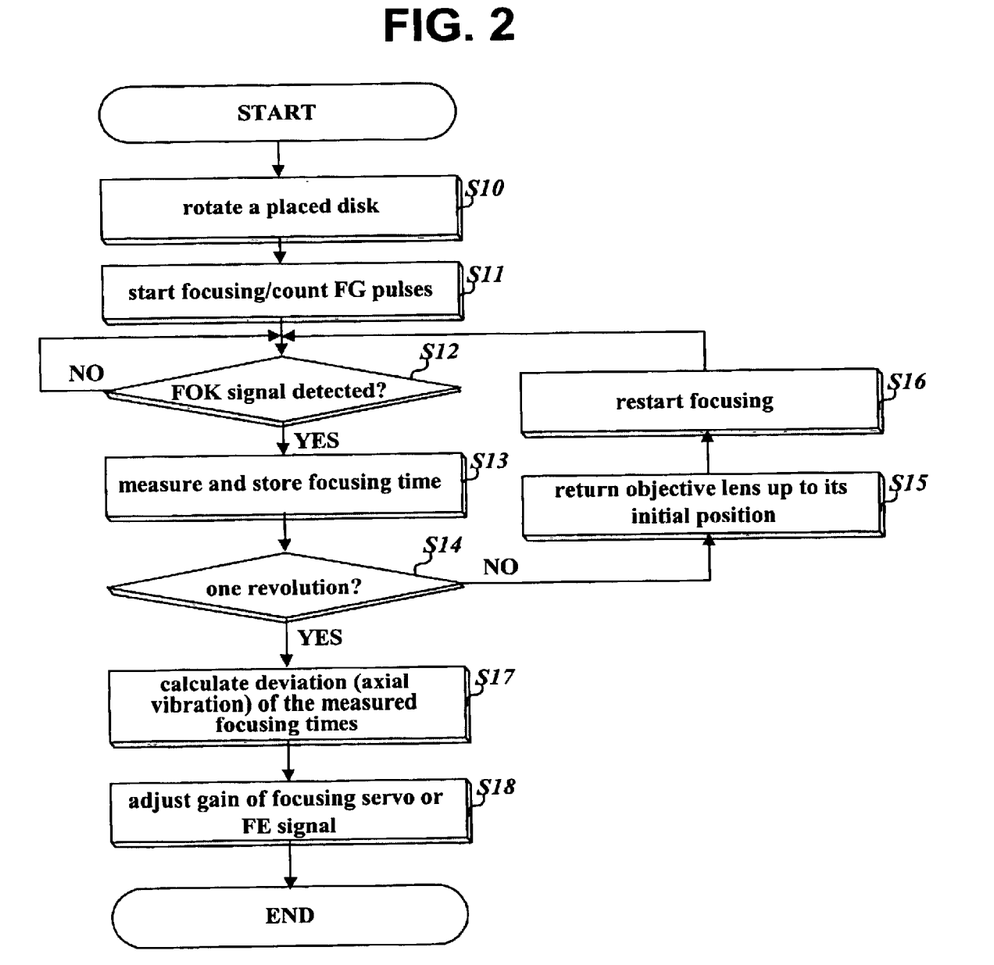
FIG. 2 is a flow chart of the first preferable embodiment of the present axial vibration measuring method.

FIG. 2 is a flow chart of the first preferable embodiment of the present axial vibration measuring method conducted by the disk device of FIG. 1.

When the disk 10 is placed in the disk device, the microcomputer 18 controls the servo unit 14 to rotate the placed disk through the spindle motor 15 (S10) and to make a beam through an objective lens of the pickup 11 be in exact focus on the disk 10. At the same time, the microcomputer 18 counts pulses of the FG signal produced from the FG signal generator 19 (S11). The rotation speed of the disk 10 at this stage is so low that focusing operation can be performed repeatedly at least three times during one revolution of the disk 10.

Whenever the FOK signal is outputted from the RF unit 12 (S12) because of exactness in focus, the microcomputer 18 measures the time from start of focusing to reception of the FOK signal with an internal timer. The microcomputer 18 stores each measured time (S13).

In the meantime, the microcomputer 18 checks whether or not one revolution is made (S14) based on the number of counted pulses from the FG signal generator 19. For example, if six pulses are outputted from the FG signal generator 19 during one revolution, the microcomputer 18 checks whether the count of the pulses are six or not.

Figure 3:
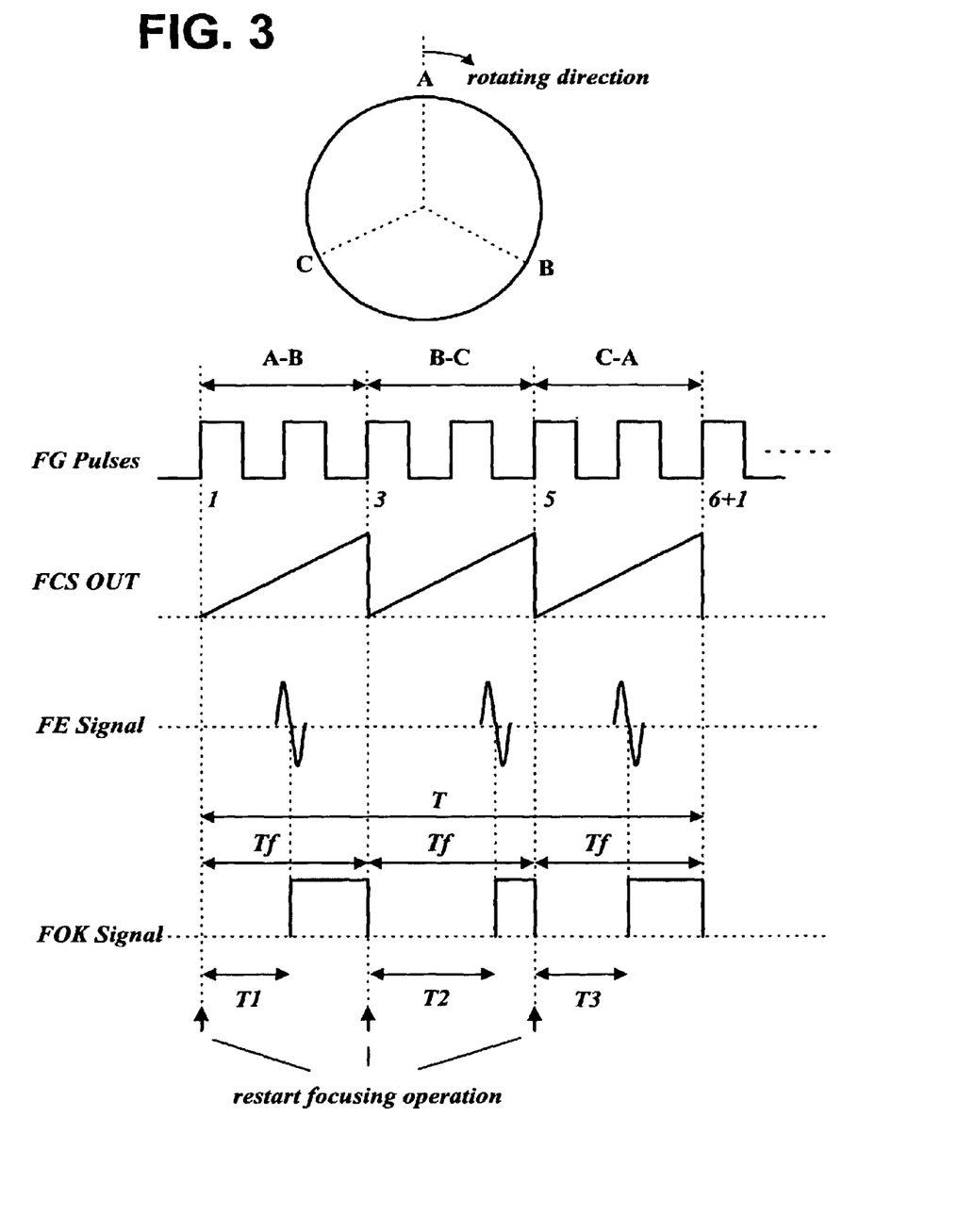
FIG. 3 shows different focusing times illustratively because of axial vibration of a disk.

If not six, it means that one revolution is not made yet, so that the microcomputer 18 returns the objective lens to its vertical initial position (S15) and conducts the focusing operation again (S16). The interval of repetitive focusing operations is preferably set to a third of revolution time. Namely, if one revolution takes time T, the interval is set to Tf=T/3 as shown in FIG. 3. Instead of the interval Tf, the pulse count can be used as a condition to restart focusing operation. Namely, when the count of the FG pulses is 1, 3, and 5, the focusing operation starts.

The time from restart of the focusing operation to output of the FOK signal (S12) is measured and stored (S13) by the microcomputer 18. These operations are repeated until one revolution is made. FIG. 3 shows waveforms of related signals produced during the above operations.

After one revolution of the disk is made (S14), the microcomputer 18 calculates deviation of the three measured times (T1, T2, and T3 in FIG. 3) (S17). The calculated deviation represents magnitude of axial vibration of the rotating disk 10.

Finally, the microcomputer 18 adjusts focusing gain of the servo unit 14 or increases amplifying rate of the FE signal to make the focusing servo loop more sensitive in proportion to the calculated deviation (namely, magnitude of axial vibration). Alternatively, the microcomputer 18 sets reproduction speed to a slower speed than the highest (S18). Because of such an adjustment, it becomes easy to keep an exact focal distance between the objective lens and the recording layer of the disk 10 even though the disk 10 rotates at the highest speed (or the slower speed than the highest) with axial vibration.

If the measured axial vibration (the calculated deviation) is beyond an allowable range to compensate, the microcomputer 18 ejects the placed disk 10 not adjusting the focusing servo.

In the first embodiment of FIG. 2, focusing time is measured at three phases of the disk 10, namely, every 120°. However, if the disk is partitioned into more phases to measure focusing time at, more accurate axial vibration can be obtained.

To get more focusing times as above, a physical mechanism must conduct a focusing operation faster at a given disk rotation speed, however, there is a limitation of the speed-up of a physical mechanism.

Figure 4:
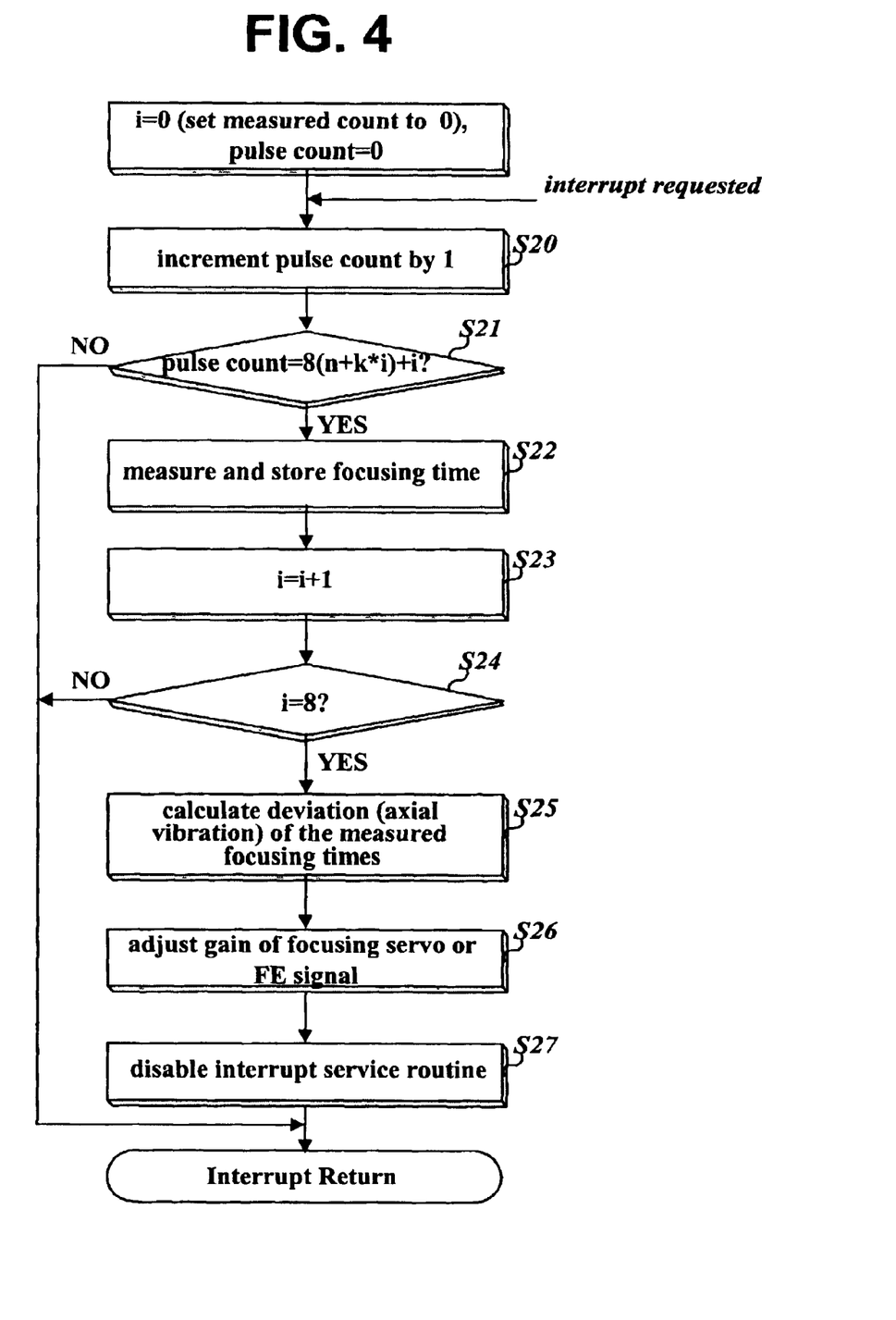
FIG. 4 is a flow chart of the second preferable embodiment of the present axial vibration measuring method.

FIG. 4 is a flow chart of the second preferable embodiment of the present axial vibration measuring method to resolve such a limitation.

It is assumed in the second embodiment that eight pulses of the FG signal are outputted during one revolution of the disk 10. And, the microcomputer 8 has an embedded interrupt service routine (ISR) that is executed whenever a pulse of the FG signal is applied.

The ISR counts every pulse (S20) and, if the count is one of 8n, 8(n+k)+1, 8(n+2*k)+2, 8(n+3*k)+3, 8(n+4*k)+4, 8(n+5*k)+5, 8(n+6*k)+6, and 8(n+7*k)+7 (S21) where n is an arbitrary number, it conducts the focusing operation and measures and stores corresponding focusing time as explained above (S22). The constant k is the number of revolutions between successive focusing attempts. For example, if k is 1 a next focusing attempt will be conducted at next phase of the disk 10 after the disk 10 makes one more rotation, and if 2, next focusing attempt will be conducted after two more rotations.

If the focusing operation is conducted like that at every phase, it is not necessary to reduce disk rotation speed intentionally to measure focusing time at each phase.

Figure 5:
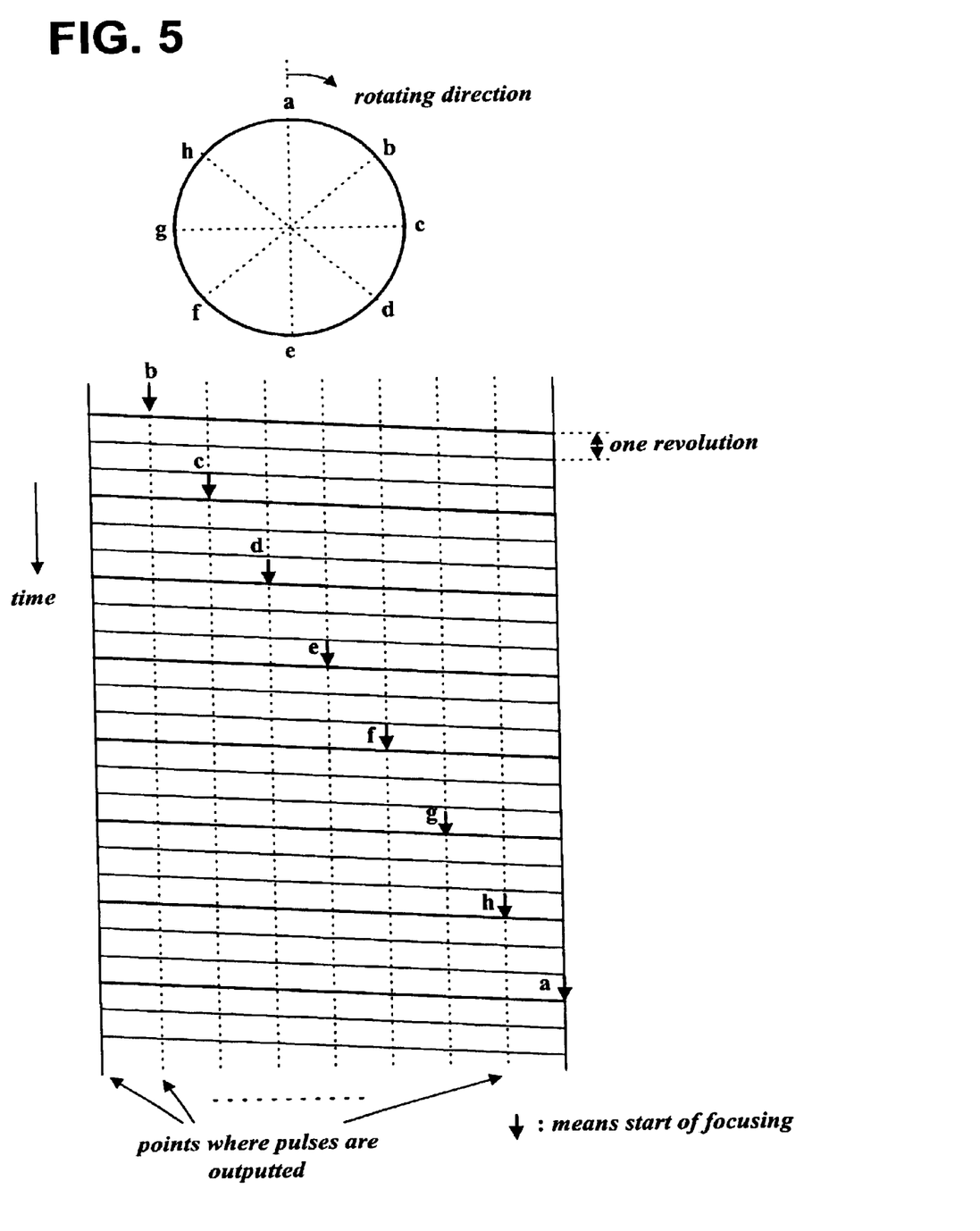
FIG. 5 shows focusing time measuring attempts schematically in case of k=2 for the second embodiment.

FIG. 5 shows focusing time measuring attempts schematically when k is 2. After focusing time is obtained at a phase, the ISR increases a measured count (S23). The focusing time measuring operation is conducted continuously at next phase until the measured count becomes 8.

After the focusing operation is conducted eight times, the deviation of eight stored focusing times is calculated (S25). Based on the deviation (namely, magnitude of axial vibration), the ISR reduces the disk reproduction speed or adjusts sensitivity of the focusing servo (S26), or ejects the placed disk 10. Finally, the microcomputer 18 disables the ISR not to be activated from the pulse of the FG signal (S27).

The focusing servo characteristic can be adjusted individually for each phase instead of overall for a disk. For the individual adjustment, the microcomputer 18 stores phase identification as well as the measured focusing time in the above-explained embodiments. The phase identification is a remainder of the pulse count divided by the number of pulses produced during one revolution, e.g., 6 in the first embodiment of FIG. 2 and 8 in the second embodiment of FIG. 4.

Figure 6:
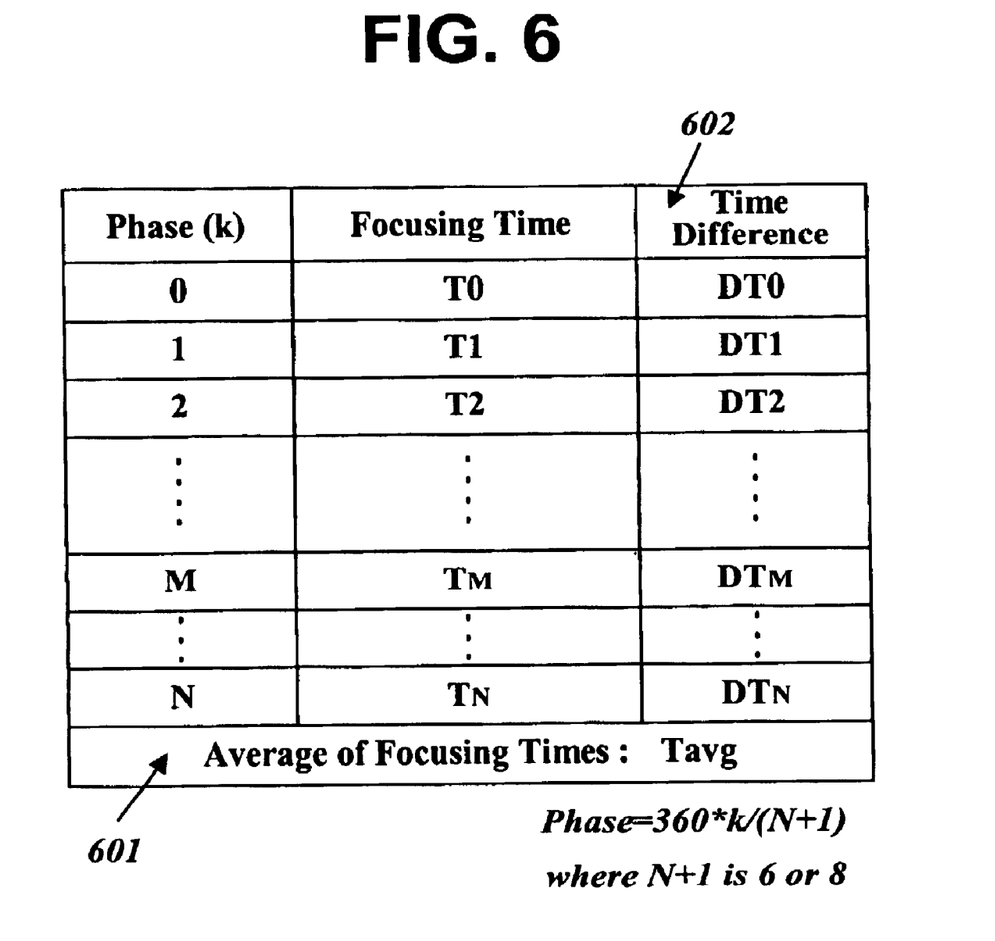
FIG. 6 is an illustrative table containing focusing times measured at partitioned phases of a disk.

Through the above operations, the microcomputer 18 constructs an information table like FIG. 6 after calculating an average Tavg 601 of all measured focusing times and respective time differences 602 between each measured time and the average Tavg 601.

Afterwards, if data reproduction of the disk is started, the microcomputer 18 predicts amplitude of the next phase with reference to the time differences 602 written in the constructed information table and adjusts gain of the focusing servo before the pickup 11 reaches the next phase. For example, if the time difference $DT_M$ is smallest the gain of the focusing servo is increased to compensate the greater magnitude of axial vibration at phase M+1 before the current reproduction point reaches the phase M+1 from current phase M.

The above-explained axial vibration measuring method ensures stable data reproduction without focusing fail from a disk rotating with axial vibration, and prevents unnecessary reproduction trials to a rotating disk of which axial vibration is too severe to compensate.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method of measuring axial vibration of a disk recording medium, comprising the steps of:

(a) selecting a plurality of equally-spaced positions to conduct focusing operation at, the positions being located circularly on the disk recording medium;

(b) conducting focusing operation at each selected position;

(c) measuring focusing time required to complete each focusing operation; and (d) calculating axial vibration of the disk recording medium based on the measured focusing times.

2. The method of claim 1, wherein the angle between the two adjacent positions is not greater than 120 degree.

3. The method of claim 1, wherein said step (c) determines the exactness in focus based on a signal made out of light intensity reflected from the disk recording medium during each focusing operation.

4. The method of claim 1, further comprising the step of reducing a reproduction speed of the disk recording medium according to the calculated axial vibration.

5. The method of claim 1, further comprising the step of adjusting a characteristic of a focusing servo mechanism according to the calculated axial vibration.

6. The method of claim 1, wherein the calculated axial vibration is determined in proportion to a deviation of all the measured focusing times.

7. A method of measuring axial vibration of a disk recording medium, comprising the steps of:

(a) conducting focusing operation at each of equally-spaced n (n 3) positions, the positions being located circularly on the disk recording medium; and (b) measuring focusing time required to complete each focusing operation, and calculating axial vibration of the disk recording medium based on the measured focusing times.

8. A method of measuring axial vibration of a disk recording medium, comprising the steps of:

(a) rotating the disk recording medium; and (b) conducting focusing operation at each of equally-spaced n (n 3) positions during one revolution of the disk recording medium, the positions being located circularly on the disk recording medium.

9. A method of measuring axial vibration of a disk recording medium, comprising the steps of:

(a) rotating the disk recording medium;

(b) conducting focusing operation at each of equally-spaced n (n 3) positions while the disk recording medium rotates, the positions being located circularly on the disk recording medium; and (c) measuring focusing time required to complete each focusing operation, and storing the measured time along with identification of the position at which the focusing time is measured.

10. The method of claim 9, wherein the position identification is a remainder of count of total pulses divided by the number of pulses during one revolution of the disk recording medium, wherein the pulses are produced while the disk recording medium rotates.

11. The method of claim 9, wherein said steps (b) and (c) are conducted during one revolution of the disk recording medium.

12. The method of claim 11, wherein the rotating speed in said step (a) is slower than data reproduction speed of the disk recording medium.

13. The method of claim 9, wherein said steps (b) and (c) conduct the focusing operation for only one among the n positions and measure focusing time thereat during one revolution of the disk recording medium.

14. A method of measuring axial vibration of a disk recording medium, comprising the steps of:

(a) detecting where on a rotating disk recording medium a current position is;

(b) measuring amplitude of axial vibration at the detected position whenever the detected position is one of predetermined equally-spaced positions, the positions being located circularly on the disk recording medium; and (c) adjusting a characteristic of a focusing servo to be suitable to a coming reproduction area next to each of equally-spaced position based on the measured amplitude at the each position, while the disk recording medium is reproduced.

15. The method of claim 14, wherein the position is identified by a remainder of count of total pulses divided by the number of pulses during one revolution of the disk recording medium, wherein the pulses are produced while the disk recording medium rotates.

16. An apparatus of measuring axial vibration of a disk recording medium, comprising:

a driving unit rotating the disk recording medium;

a servo control unit conducting focusing operation; and a controller selecting a plurality of equally-spaced positions to conduct focusing operation at, controlling the servo control unit to conduct the focusing operation at each selected position, measuring focusing time required to complete each focusing operation; and calculating axial vibration of the disk recording medium based on the measured focusing times, wherein the positions are located circularly on the disk recording medium.

17. The apparatus of claim 16, wherein the angle between the two adjacent positions is not greater than 120 degree.

18. An apparatus of measuring axial vibration of a disk recording medium, comprising:

a driving unit rotating the disk recording medium;

a servo control unit conducting focusing operation; and a controller controlling said servo unit to conduct the focusing operation at each of equally-spaced n (n 3) positions during one revolution of the disk recording medium, wherein the positions are located circularly on the disk recording medium.

19. An apparatus of measuring axial vibration of a disk recording medium, comprising:

a driving unit rotating the disk recording medium;

a servo control unit conducting focusing operation; and a controller controlling said servo unit to conduct the focusing operation at each of equally-spaced n (n 3) positions, and measuring focusing time required to complete each focusing operation, and calculating axial vibration of the disk recording medium based on the measured focusing times, wherein the positions being located circularly on the disk recording medium.

20. An apparatus of measuring axial vibration of a disk recording medium, comprising:

a driving unit rotating the disk recording medium;

an encoder outputting periodic pulses while the disk recording medium rotates;

a servo control unit conducting focusing operation; and a controller detecting a current angular position on the rotating disk recording medium based on the number of the pulses outputted from said encoder, measuring amplitude of axial vibration at the detected position whenever the detected position is one of predetermined equally-spaced positions, the positions being located circularly on the disk recording medium, and adjusting a characteristic of a focusing servo to be suitable to a coming reproduction area next to each of equally-spaced position based on the measured amplitude at the each position during data reproduction of the disk recording medium.

* * * * *